(12) United States Patent
Evans

(10) Patent No.: US 6,377,947 B1
(45) Date of Patent: *Apr. 23, 2002

(54) INFORMATION RETRIEVAL BASED ON USING AND LOCATING SUBDOCUMENTS

(75) Inventor: David A. Evans, Pittsburgh, PA (US)

(73) Assignee: Claritech Corporation, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/645,954

(22) Filed: Aug. 25, 2000

Related U.S. Application Data

(62) Division of application No. 09/390,245, filed on Sep. 3, 1999, now Pat. No. 6,115,706, which is a division of application No. 08/900,641, filed on Jul. 25, 1997, now Pat. No. 5,999,925.

(51) Int. Cl.[7] ............................................. G06F 17/30
(52) U.S. Cl. .......................................... 707/5; 707/526
(58) Field of Search .......................... 707/5, 1, 3, 526

(56) References Cited

U.S. PATENT DOCUMENTS

| | | | |
|---|---|---|---|
| 5,267,156 A | 11/1993 | Nomiyama | 704/10 |
| 5,293,552 A | 3/1994 | Aalbersberg | 707/5 |
| 5,325,298 A | 6/1994 | Gallant | 704/9 |
| 5,331,556 A | 7/1994 | Black, Jr. et al. | 704/9 |
| 5,384,703 A | 1/1995 | Withgott et al. | 707/531 |
| 5,559,940 A | 9/1996 | Hutson | 707/526 |
| 5,600,835 A | 2/1997 | Garland et al. | 707/5 |
| 5,604,910 A | 2/1997 | Kojima et al. | 707/3 |
| 5,642,502 A | 6/1997 | Driscoll | 707/5 |
| 5,675,788 A | 10/1997 | Husick et al. | 707/104 |
| 5,692,176 A | 11/1997 | Holt | 707/5 |
| 5,724,571 A | 3/1998 | Woods | 707/5 |
| 6,026,388 A | 2/2000 | Liddy et al. | 707/5 |

*Primary Examiner*—Jack Choules
(74) *Attorney, Agent, or Firm*—Jones, Day, Reavis & Pogue; Blaney Harper

(57) ABSTRACT

In a novel approach for retrieving information a set of sub-documents first is established based upon a set of documents. A query is processed which operates on the set of sub-documents, causing a score to be generated for each sub-document. The score for each sub-document is indicative of the relevance of the corresponding sub-document to the query. The scores are reviewed and the best sub-document is retrieved. According to one aspect of the invention, the best sub-document has a score that indicates the highest relevance between the sub-document and the query. According to another aspect of the invention, in response to a user selection, the next best sub-document is identified and retrieved. The sub-documents are also presented to the user in an order based upon the scores. According to another aspect of the invention, the document containing the sub-document having the best score is displayed and automatically scrolled to the location of the sub-document having the best score. Based upon user input, the document is automatically scrolled to the location containing the next best sub-document. If the next best sub-document is contained in another document, that document is automatically loaded.

9 Claims, 6 Drawing Sheets

| SUB-DOCUMENT | SCORE |
|---|---|
| 210 | 0.85 |
| 212 | 0.98 |
| 214 | 0.61 |
| 216 | 0.93 |
| 218 | 0.47 |
| 220 | 0.91 |

INFORMATION RETRIEVAL BASED ON USING AND LOCATING SUBDOCUMENTS

CROSS REFERENCE TO RELATED APPLICATIONS

This application is a divisional of patent application Ser. No. 09/390,245, filed Sep. 3, 1999, now allowed as U.S. Pat. No. 6,115,706, which is a divisional of patent application Ser. No. 08/900,641, filed Jul. 25, 1997, now allowed as U.S. Pat. No. 5,999,925.

FIELD OF THE INVENTION

The invention relates to information retrieval, and more specifically, to a novel method and apparatus for retrieving information using sub-documents comporting to user queries.

BACKGROUND OF THE INVENTION

Given the plethora of information that is accessible by computer systems, particularly on distributed databases, many information retrieval systems provide sophisticated search tools. A search tool allows a user to specify a query to operate on a set of target documents. Often, a user builds a query by combining one or more search terms with logical operators such as AND, OR and NOT. Then, the query is submitted to a search process, sometimes referred to as a "search engine," which processes the query and causes the query to operate on the set of target documents that are typically stored on a database. Once the query is processed, any documents that satisfy the query, sometimes referred to as "hits," are identified by the search engine and presented to the user. In situations where a large number of documents satisfy the query, additional terms are typically added to a query to reduce the number of hits to a manageable number. A user then selects one or more of the identified documents to be retrieved.

Once the selected documents have been retrieved, the user must review the documents to locate the information specified in the search query. For situations where many documents are selected, or one or more of the selected documents is large, locating the hits within the documents can be an arduous task. To resolve this problem, some information retrieval systems provide a local search utility to re-execute the query to locate the portions of the selected documents containing the hit. However, this requires an extra search of the selected documents.

Consequently, in view of the need to automatically retrieve information and the limitations in the prior approaches for retrieving information at the document level, an alternative approach for automatically retrieving information is highly desirable.

SUMMARY OF THE INVENTION

An approach for retrieving information using sub-documents is described. First, a set of sub-documents is established based upon a set of documents. Then a query is processed that operates on the set of sub-documents, causing a score to be generated for each sub-document.

The score for each sub-document is indicative of the relevance of the corresponding subdocument to the query. The scores are reviewed and the sub-document having a score that indicates the highest relevance between the sub-document and the query is retrieved.

According to another aspect of the invention, in response to a user selection, the sub-document having a score that indicates the next highest relevance between the sub-document and the query is retrieved. The sub-documents may be presented to the user in an order based upon the scores.

According to another aspect of the invention, the document containing the sub-document having the score that indicates the highest relevance between the sub-document and the query is displayed and automatically scrolled to the location of the sub-document. Based upon user input, the document is automatically scrolled to other sub-documents based upon their scores. If any of those sub-documents are contained in another document, that document is automatically loaded.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for retrieving information using sub-documents is described. In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

FUNCTIONAL OVERVIEW

Generally, the approach for retrieving information in accord with the invention involves processing a query that operates on a set of sub-documents and causes the sub-documents to be scored based upon how relevant each sub-document is to the query. Each sub-document represents at least a portion of a document.

Figure 1:
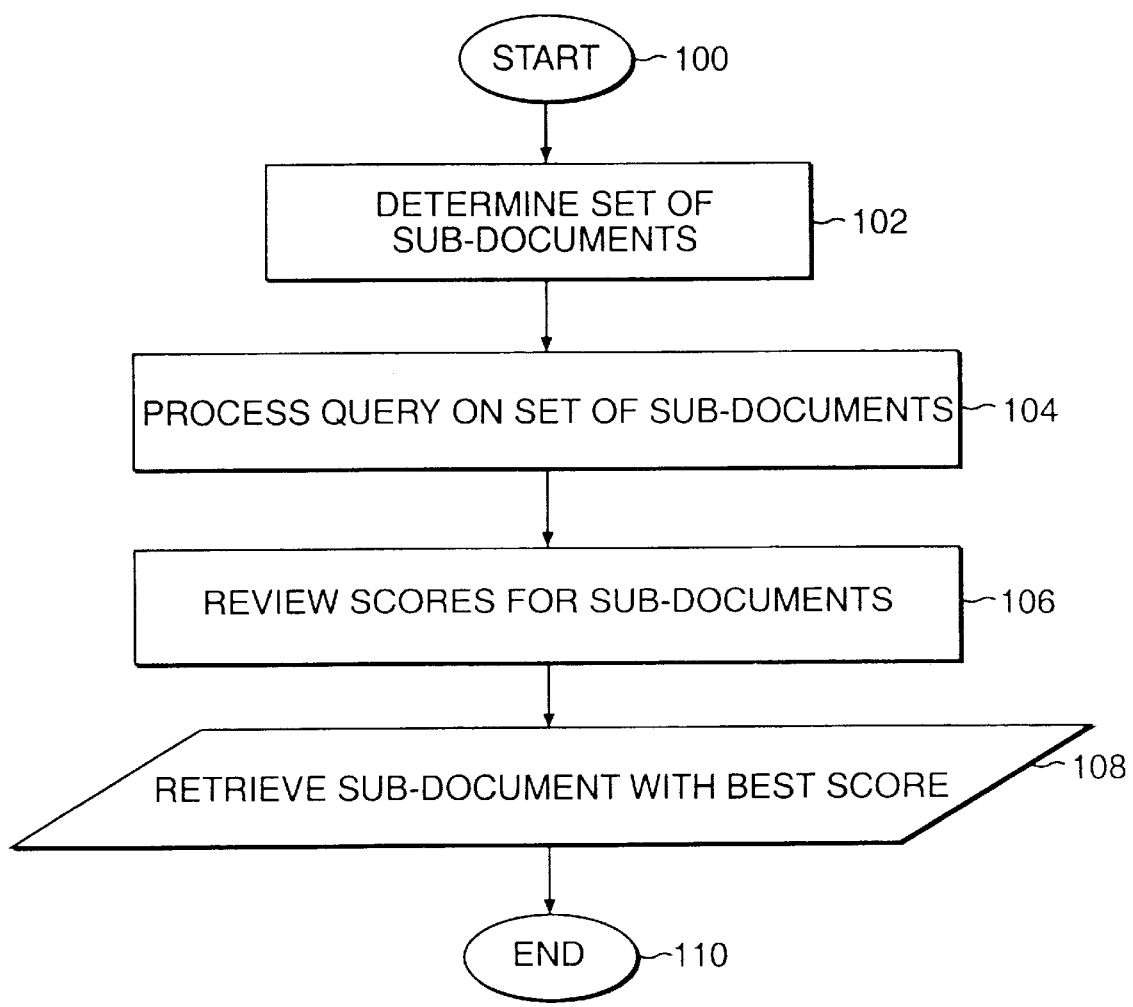
FIG. 1 is a flow chart that illustrates a method for retrieving information using sub-documents according to an embodiment of the invention.

The approach is illustrated by the top level flow chart of FIG. 1. After starting in step 100, in step 102, a set of sub-documents is determined for each document in a set of documents to be queried. Then, in step 104, a query is processed that operates on the set of sub-documents and causes each sub-document to be scored. The score for each sub-document indicates relevance of the sub-document to the query.

In step 106, the scores for the sub-documents are reviewed. In step 108, the subdocument having the "best" score is retrieved. The determination of a "best" score depends upon the context in which the query is processed. For example, in some situations it may be desirable to retrieve the sub-document that is the most relevant to the query. On the other hand, in another situation it may be desirable to identify the sub-document that is the least relevant to the query.

DETAILED DESCRIPTION

Figures 2, 3:
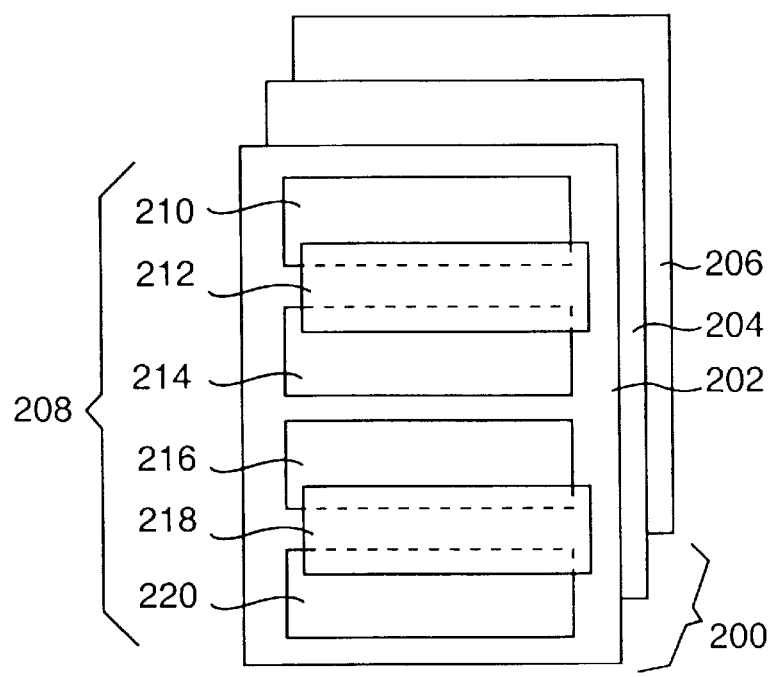
FIG. 2 illustrates a set of sub-documents and a set of documents according to an embodiment of the invention.
FIG. 3 is a table that illustrates a set of scores associated with the set of sub-documents of FIG. 2 according to an embodiment of the invention.

The approach for retrieving information using sub-documents according to an embodiment of the invention is now described in more detail with reference to FIGS. 2–5. FIG. 2 illustrates a set of documents 200 that includes three documents 202, 204 and 206. According to one embodiment of the invention, a document is a text file containing one or more strings of characters or other symbols that are used to form more complex constructs. For example, strings of characters may form words, phrases, sentences and paragraphs. The constructs contained in the documents are not limited to constructs or forms associated with any particular language.

1. Determining A Set of Sub-Documents

A set of sub-documents is determined for each document 202, 204, 206 where each sub-document represents at least a portion of a document. For example, in the context of a text-based document, a sub-document may represent a single character, several words or sentences or even an entire document. When a set of sub-documents contains more than one sub-document, the sub-documents may represent different portions of the corresponding document and may represent some common information. In addition, the location of a sub-document boundary does not have to correspond to the boundary of a document construct such as the end of a sentence or paragraph.

For example, referring again to FIG. 2, a set of sub-documents 208 is determined based upon document 202 and includes sub-documents 210, 212, 214, 216, 218 and 220. As illustrated, sub-document 212 contains some document information in common with subdocument 210 and also contains other document information in common with sub-document 214. However, sub-document 212 contains information which is contained neither in sub-document 210 nor sub-document 214.

2. Processing a Query On a Set of Sub-Documents

As previously discussed, once a set of sub-documents has been determined for each document in the set of documents to be queried, a query is processed which causes the query to operate on the sets of sub-documents. When the query operates on the set of sub-documents, a score is generated for each sub-document. According to an embodiment of the invention, the score for each sub-document indicates the relevance of the sub-document to the query. Any of the well-known approaches for scoring a target document based upon a query may be used.

As illustrated in the table of FIG. 3, each of the sub-documents 210–220 from FIG. 2 is depicted with a corresponding score based upon the processing of a query against the set of sub-documents 208. In the table illustrated in FIG. 3, a higher score indicates a higher likely relevance of the corresponding sub-document to the query. However, other scoring approaches may be implemented.

3. Reviewing the Scores for Sub-Documents

Once the sub-documents have been scored, the sub-document having the "best" score is retrieved. As previously discussed, the "best" score may indicate the highest likely relevance between a sub-document and the query. However, the "best" score may instead indicate the lowest relevance between a sub-document and a query, depending upon particular requirements. For example, it may be desirable to identify sub-documents having a relatively low relevance to the query, so that those sub-documents can be excluded from consideration during the processing of subsequent queries. As illustrated in FIG. 3, sub-document 218 has a score of 0.47, indicating a lower relevance to the query than sub-document 220, having a score of 0.91. Those sub-documents having a score less than a predetermined threshold, such as 0.75, may be excluded from consideration. This would exclude sub-documents 218 and 214.

4. Retrieving Sub-Documents

Figure 4A:
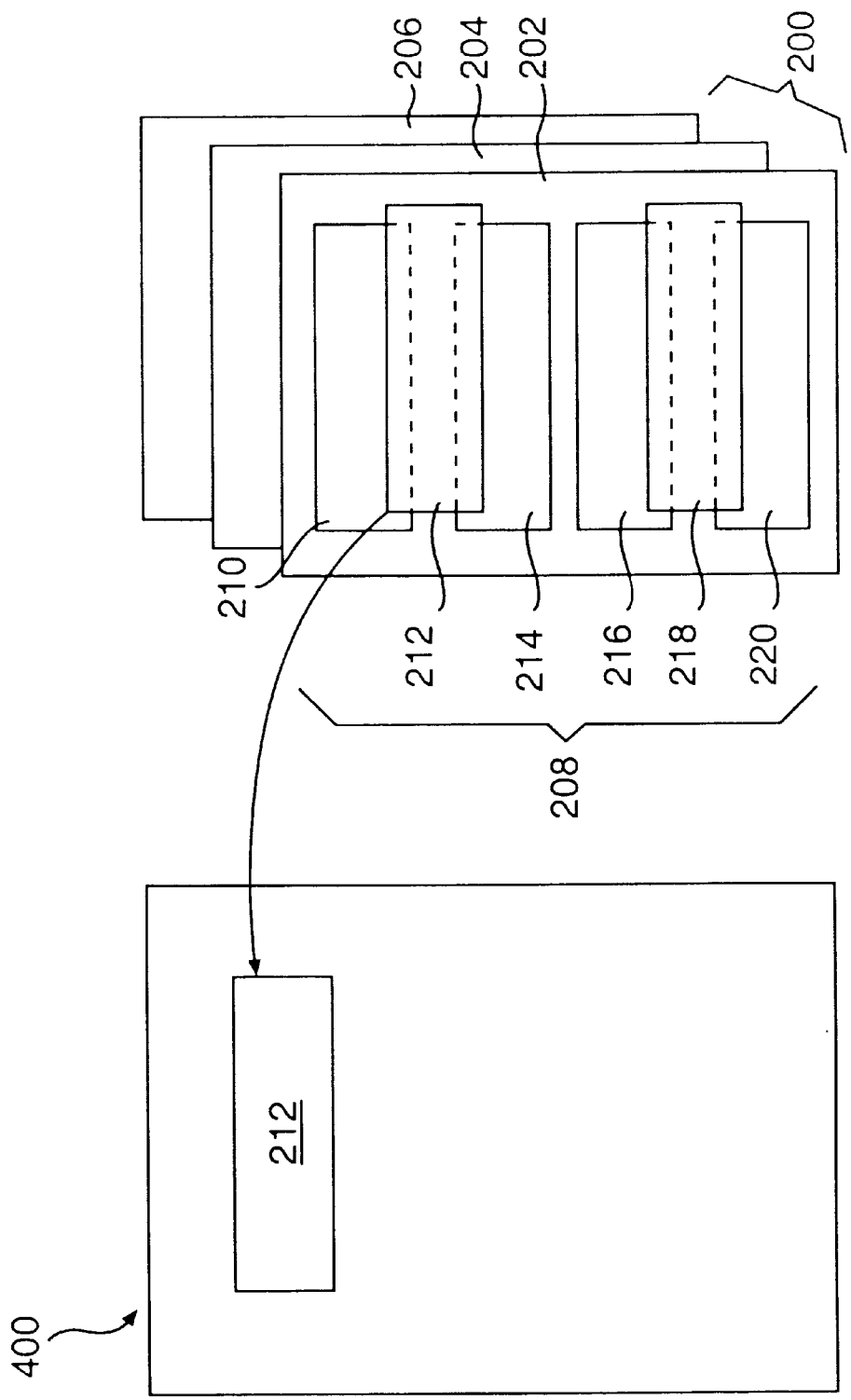
FIG. 4A illustrates the retrieval of a sub-document from a set of sub-documents according to embodiment of the invention.

According to one embodiment of the invention, after reviewing the scores for all of the sub-documents, the sub-document having the best score is retrieved and displayed to a user in a user interface. In the exemplary scores illustrated in FIG. 3, sub-document 212 has the highest score. Accordingly, as illustrated in FIG. 4A, sub-document 212 is retrieved and displayed on a user interface 400.

According to another embodiment of the invention, after displaying the sub-document having the best score, a user may cause the sub-document having the next best score to be retrieved and displayed by interacting with user interface 400. For example, by clicking on or selecting a user interface "button," sub-document 216, having the next highest score of 0.93, is retrieved and displayed on user interface 400.

Figure 4B:
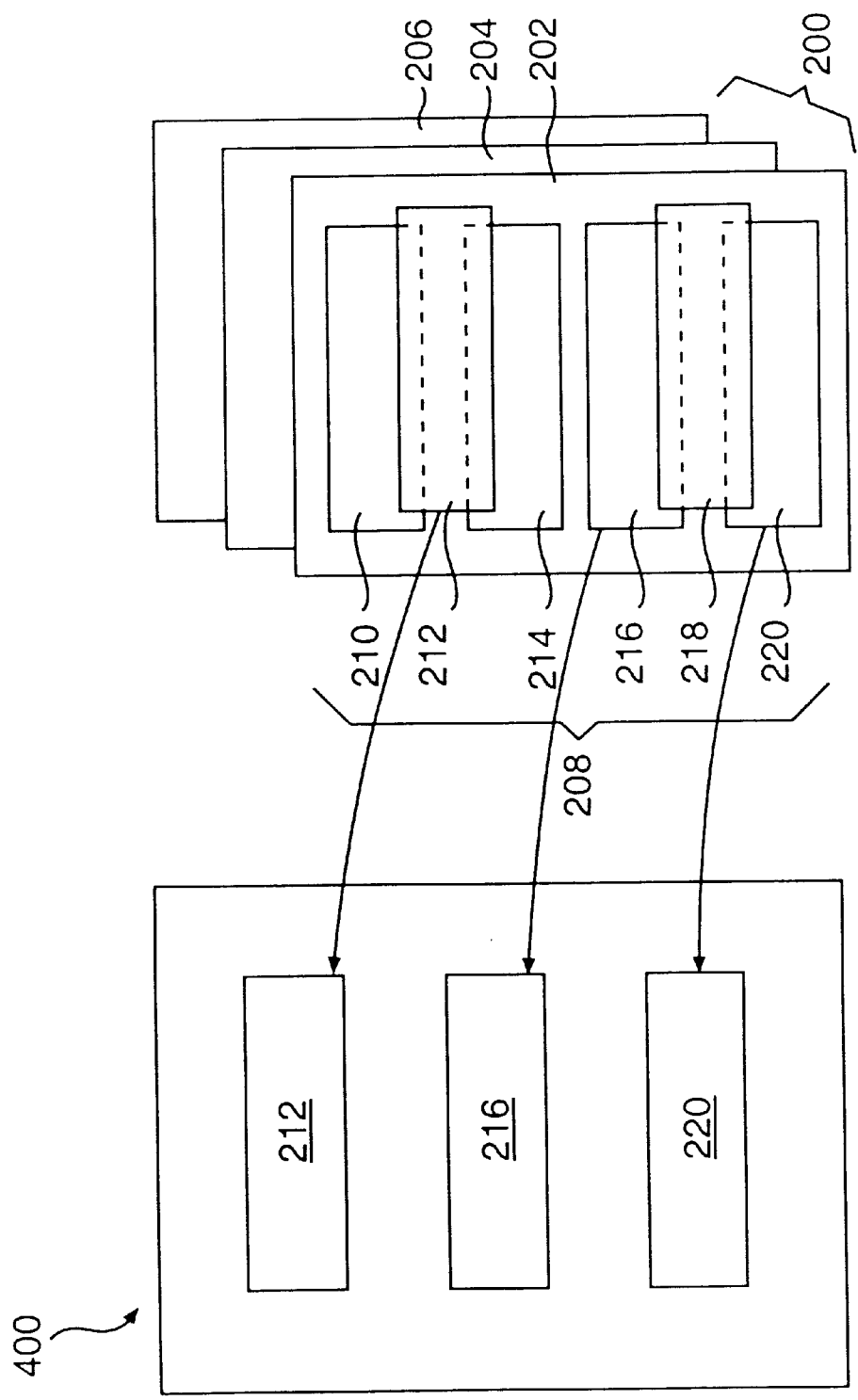
FIG. 4B illustrates the retrieval of a one or more sub-documents from a set of sub-documents according to embodiment of the invention.

According to another embodiment of the invention, multiple sub-documents are displayed on a user interface in an order based upon their scores. As illustrated in FIG. 4B, sub-document 212 having a score of 0.98 is displayed near the top of user interface 400, followed by sub-document 216 having a score of 0.93 and finally, sub-document 220, having a score of 0.91.

Figure 4C:
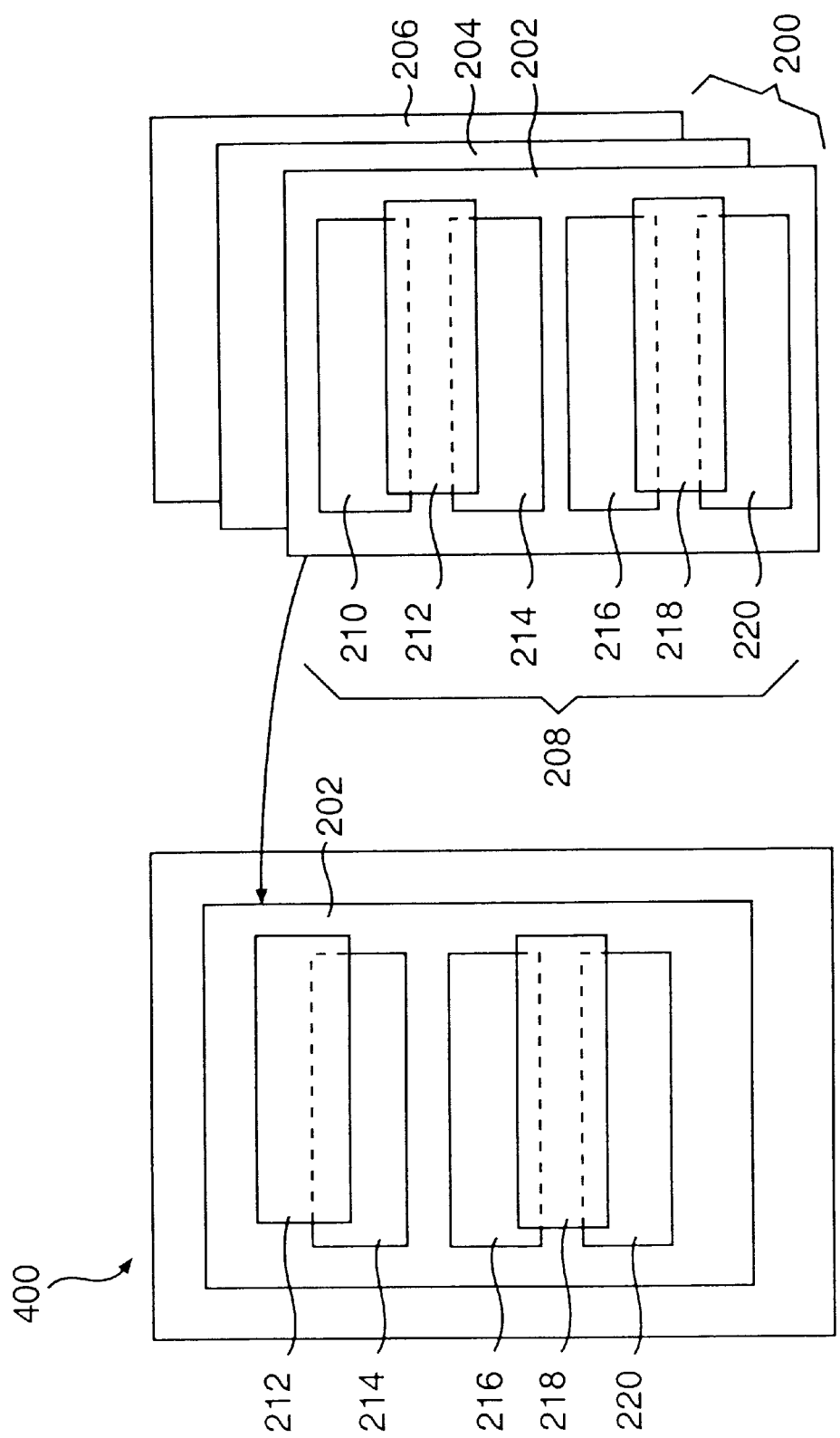
FIG. 4C illustrates the retrieval of one or more sub-documents from a set of sub-documents according to another embodiment of the invention.

According to another embodiment of the invention, a document containing the best sub-document is displayed and scrolled to the location of the best sub-document to cause the best sub-document to be displayed. As illustrated in FIG. 4C, document 202 is displayed on user interface 400 and scrolled so that sub-document 212 appears at the top of user interface 400. In addition, in response to user input, document 202 is automatically scrolled so that the next best sub-document is displayed at the top of user interface 400. In the present example, when a user requests the next best sub-document, document 202 is scrolled so that sub-document 216 is located at the top of user interface 400. This feature allows a user to step through a set of sub-documents based upon the score for each sub-document. Alternatively, the sub-documents may be displayed in other orders. For example, the document containing the sub-document having the lowest score, the "worst" sub-document, as described previously, is displayed. Then the user can step through the sub-documents based upon increasing scores.

According to another embodiment of the invention, the sub-documents do not have to be included in a single document. Rather, the user selection will automatically display the next best sub-document, even if the next best sub-document is contained in another document. For example, as illustrated in FIG. 4C, sub-document 212 has the highest score and is contained in document 202. A user may select to view the next best sub-document, which in the present example is sub-document 216, having a score of 0.93. If sub-document 216 were contained in sub-document 216 is displayed at the top of user interface 400.

Although embodiments of the invention have been described in the context of a sub-document representing a portion of a single document, the invention is also applicable to sub-documents that represent portions of more than one document. For example, a sub-document may represent an ending portion of a first document and a beginning portion of a second document.

HARDWARE OVERVIEW

Figure 5:
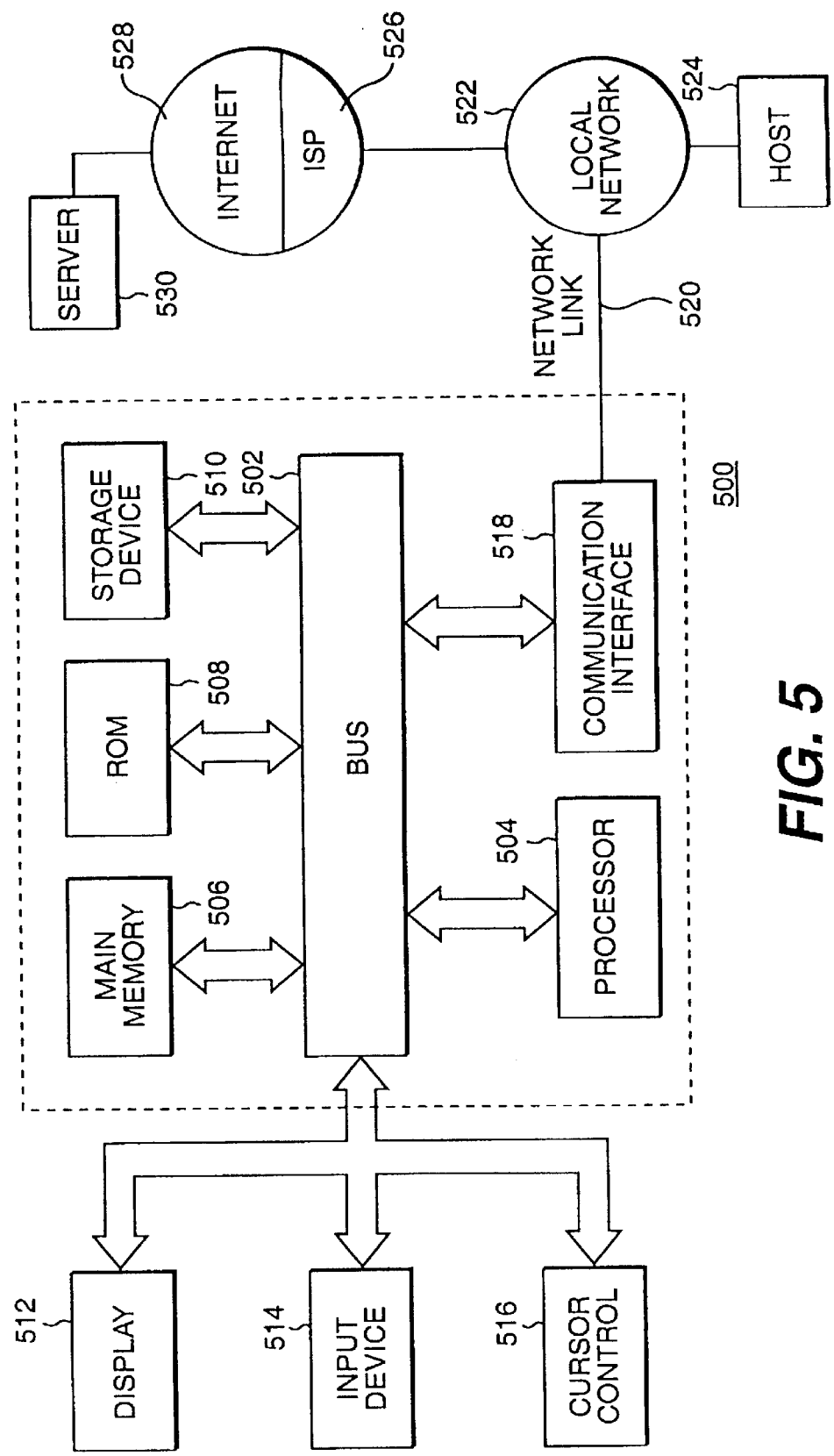
FIG. 5 is a block diagram of a computer system on which embodiments of the invention may be implemented.

FIG. 5 is a block diagram which illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), which allows the device to specify positions in a plane.

The invention is related to the use of computer system 500 to retrieving information using sub-documents. According to one embodiment of the invention, retrieval of information using sub-documents is provided by computer system 500 in response to processor 504 executing sequences of instructions contained in main memory 506. Such instructions may be read into main memory 506 from another computer-readable medium, such as storage device 510. However, the computer-readable medium is not limited to devices such as storage device 510. For example, the computer-readable medium may include a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read. Execution of the sequences of instructions contained in main memory 506 causes processor 504 to perform the process steps previously described. In alternative embodiments, hard-wired circuitry may be used in place of or in combination with software instructions to implement the invention. Thus, embodiments of the invention are not limited to any specific combination of hardware circuitry and software.

Computer system 500 also includes a communication interface 518 coupled to bus 502. Communication interface 508 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals which carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet"528. Local network 522 and Internet 528 both use electrical, electromagnetic or optical signals which carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for the retrieval of information using sub-documents as described herein.

The received code may be executed by processor 504 as it is received, and/or stored in storage device 510, or other non-volatile storage for later execution. In this manner, computer system 500 may obtain application code in the form of a carrier wave.

The invention provides several advantages over prior information retrieval approaches. The use of sub-documents provides for the retrieval of specific portions (sub-documents) of documents based upon sub-document scores instead of retrieving an entire document. A user can then step through each of the sub-documents based upon the sub-document scores. Alternatively, a document containing a sub-document having a score that satisfies certain retrieval criteria is displayed and automatically scrolled to the best sub-document. The user can then step to the next sub-documents by making a request to a user interface. This allows a user to quickly view the most relevant portions (sub-documents) of one or more documents on which a query has been processed.

In the foregoing specification, the invention has been described with reference to specific embodiments thereof. It will however, be evident that various modifications and changes may be made thereto without departing from the broader spirit and scope of the invention. Accordingly, the specification and drawings are to be regarded in an illustrative rather than a restrictive sense.

What is claimed is:

1. An information system for displaying documents, comprising:
   a) a memory; and
   b) one or more processors coupled to the memory, the memory storing a set of computer instructions which when executed by the one or more processors, cause the one or more processors to perform the steps of:

i) determining a plurality of sub-documents from the plurality of documents, each sub-document representing a portion less than the entirety of a document in the plurality of documents;

ii) processing a query that operates on the plurality of sub-documents to cause a score to be generated for each sub-document, wherein each score is indicative of the relevance of the corresponding sub-document to the query;

iii) ranking said sub-documents according to said corresponding relevance scores;

iv) retrieving one of the plurality of documents comprising a sub-document having a corresponding ranked score;

v) displaying said document such that said document is scrolled to a location of a first ranked sub-document within said document; and vi) displaying said document such that said document is scrolled to a second ranked sub-document within said document.

2. The system of claim 1, wherein the computer instructions for performing the step of displaying said document is based upon said first ranked sub-document having a corresponding score indicative of a higher relevance than said second ranked sub-document.

3. The system of claim 1, wherein the computer instructions for performing the step of displaying said document is based upon said first ranked sub-document having a corresponding score indicative of a lower relevance than said second ranked sub-document.

4. An information system for retrieving information from a set of documents, the computer system comprising:

a) a memory; and b) one or more processors coupled to the memory, the memory storing a set of computer instructions which when executed by the one or more processors, cause the one or more processors to perform the steps of:

i) determining a plurality of sub-documents from the plurality of documents, each sub-document representing a portion less than the entirety of a document in the plurality of documents;

ii) processing a query that operates on the plurality of sub-documents to cause a score to be generated for each sub-document, wherein each score is indicative of the relevance of the corresponding sub-document to the query;

iii) ranking said sub-documents according to said corresponding relevance scores;

iv) retrieving one of the plurality of documents comprising a sub-document having a corresponding ranked score;

v) displaying said document such that said document is scrolled to a location of a first ranked sub-document within said document;

vi) retrieving an other of the plurality of documents comprising a second sub-document having a corresponding ranked score; and vii) displaying said other document such that said document is scrolled to said second ranked sub-document within said document.

5. The system of claim 4, wherein the computer instructions for performing the step of displaying said document is based upon said first ranked sub-document having a corresponding score indicative of a higher relevance than said second ranked sub-document.

6. The system of claim 4, wherein the computer instructions for performing the step of displaying said document is based upon said first ranked sub-document having a corresponding score indicative of a lower relevance than said second ranked sub-document.

7. A computer-readable medium having stored thereon a plurality of sequences of instructions for displaying information from a set of documents, the plurality of sequences of instructions including sequences of instructions which, when executed by one or more processors, cause the one or more processors to perform the steps of:

a) determining a plurality of sub-documents from the plurality of documents, each sub-document representing a portion less than the entirety of a document in the plurality of documents;

b) processing a query that operates on the plurality of sub-documents to cause a score to be generated for each sub-document, wherein each score is indicative of the relevance of the corresponding sub-document to the query;

c) ranking said sub-documents according to said corresponding relevance scores;

d) retrieving one of the plurality of documents comprising a sub-document having a corresponding ranked score;

e) displaying said document such that said document is scrolled to a location of a first ranked sub-document within said document; and f) displaying said document such that said document is scrolled to a second ranked sub-document within said document.

8. The computer-readable medium of claim 7, wherein said first ranked sub-document has a corresponding score indicative of a higher relevance than said second ranked sub-document.

9. The computer-readable medium of claim 7, wherein said first ranked sub-document has a corresponding score indicative of a lower relevance than said second ranked sub-document.

* * * * *